United States Patent
Jung et al.

(10) Patent No.: US 9,591,225 B2
(45) Date of Patent: Mar. 7, 2017

(54) PHOTOGRAPHING DEVICE FOR DISPLAYING IMAGE AND METHODS THEREOF

(71) Applicant: SAMSUNG ELECTRONICS CO., LTD., Suwon-si (KR)

(72) Inventors: Jong-woo Jung, Hwaseong-si (KR); In-sik Myung, Incheon (KR); Hye-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 14/087,779

(22) Filed: Nov. 22, 2013

(65) Prior Publication Data
US 2014/0146212 A1  May 29, 2014

(30) Foreign Application Priority Data
Nov. 26, 2012 (KR) .................. 10-2012-0134824

(51) Int. Cl.
*H04N 5/232* (2006.01)
*H04N 1/00* (2006.01)
*H04N 5/262* (2006.01)

(52) U.S. Cl.
CPC ..... *H04N 5/23293* (2013.01); *H04N 5/23245* (2013.01); *H04N 1/00442* (2013.01); *H04N 5/2625* (2013.01)

(58) Field of Classification Search
None
See application file for complete search history.

(56) References Cited

U.S. PATENT DOCUMENTS

| | | | |
|---|---|---|---|
| 7,714,926 B2 * | 5/2010 | Kobayashi et al. ..... 348/333.11 |
| 7,839,445 B2 | 11/2010 | Kim |
| 8,732,580 B2 * | 5/2014 | Yoritate et al. ............... 715/716 |
| 2006/0050140 A1 * | 3/2006 | Shin ..................... G11B 27/031 348/14.02 |
| 2007/0126877 A1 * | 6/2007 | Yang ........................ 348/207.99 |
| 2008/0055416 A1 * | 3/2008 | Aoki ......................... 348/207.1 |
| 2008/0239133 A1 * | 10/2008 | Cazier ............... H04N 5/23293 348/333.05 |
| 2009/0007188 A1 * | 1/2009 | Omernick .......... H04N 21/2402 725/62 |
| 2009/0322893 A1 * | 12/2009 | Stallings et al. ........... 348/222.1 |
| 2010/0053323 A1 * | 3/2010 | Izawa ........................... 348/136 |
| 2010/0066763 A1 * | 3/2010 | Macdougall et al. ........ 345/656 |
| 2010/0302409 A1 | 12/2010 | Matas et al. |
| 2011/0238676 A1 * | 9/2011 | Liu et al. ...................... 707/752 |
| 2012/0105657 A1 * | 5/2012 | Yokohata ............. H04N 5/2257 348/208.4 |
| 2013/0057713 A1 * | 3/2013 | Khawand .................. 348/208.1 |

* cited by examiner

*Primary Examiner* — Roberto Velez
*Assistant Examiner* — Quan Pham
(74) *Attorney, Agent, or Firm* — Sughrue Mion, PLLC

(57) ABSTRACT

A photographing method of a photographing device is disclosed. The method includes displaying a photographing screen which is divided into a live view area and at least one photographed image area; displaying a photographed image on the at least one photographed image area in response to photographing being performed; and scrolling the at least one photographed image area in a direction corresponding to a scroll gesture of a user in response to the scroll gesture on the photographing screen.

14 Claims, 14 Drawing Sheets

FIG. 5
(a) MANUAL PHOTOGRPAHING MODE      (b) AUTOMATIC PHOTOGRAPHING MODE
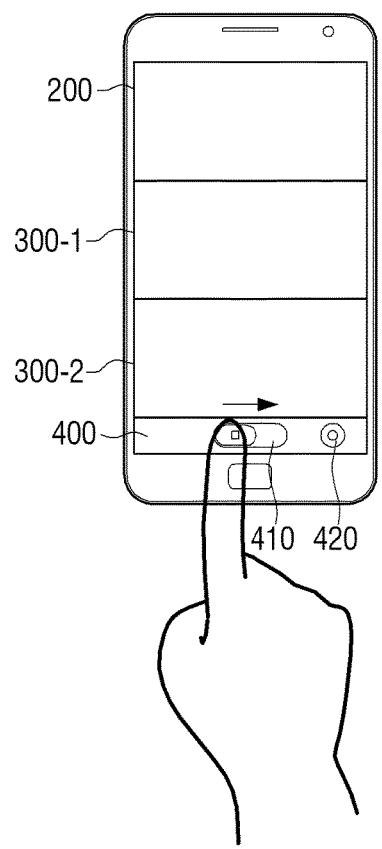
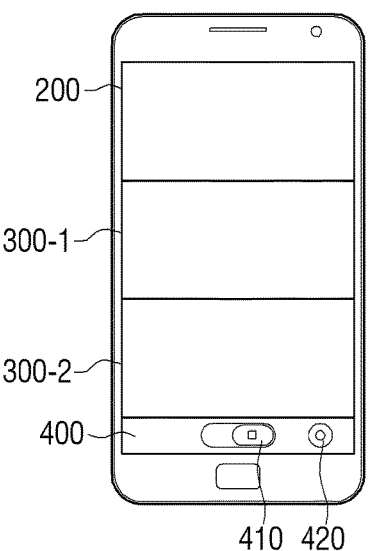

FIG. 8
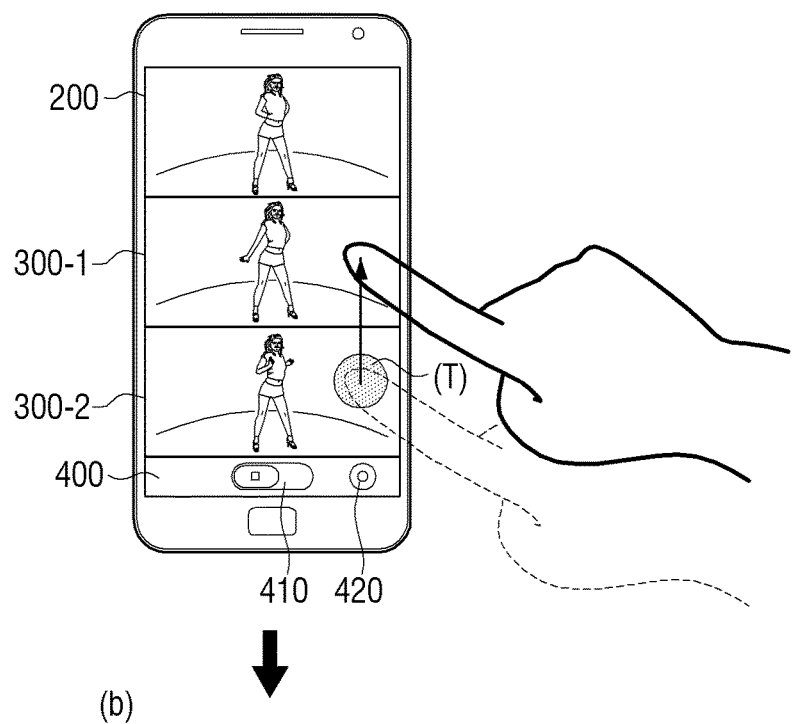
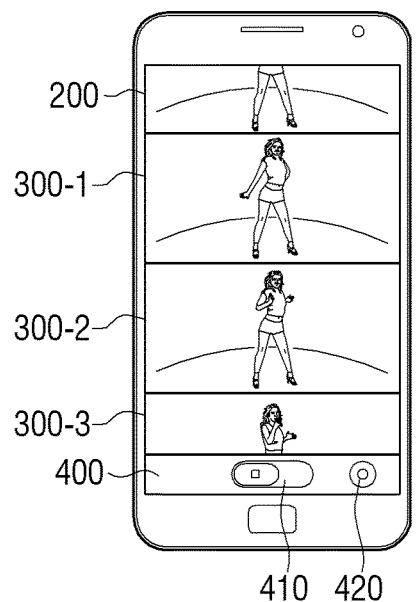

FIG. 9
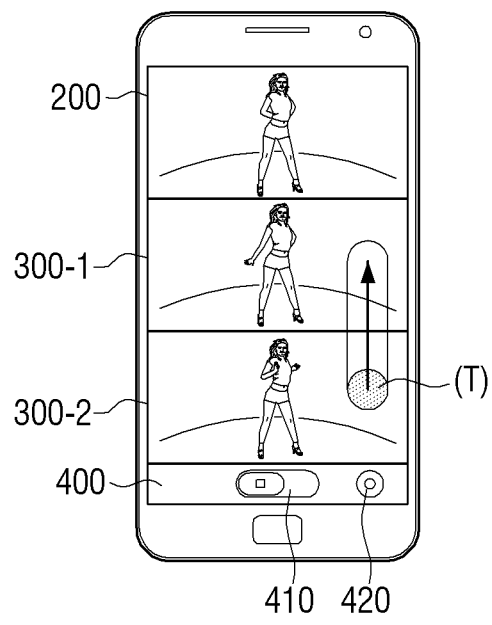
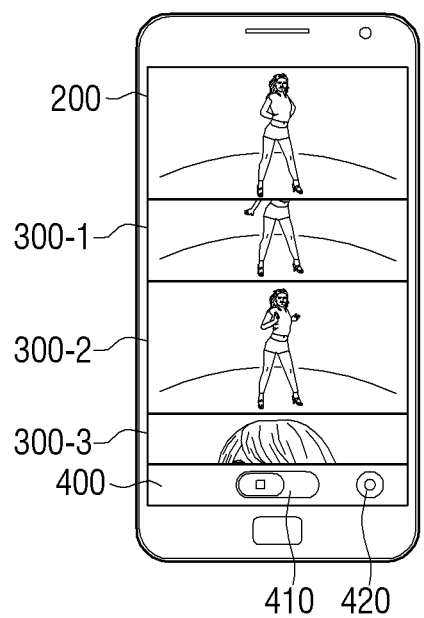

FIG. 10
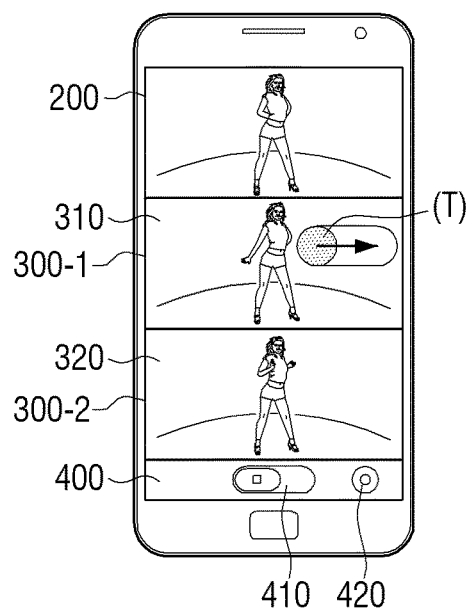
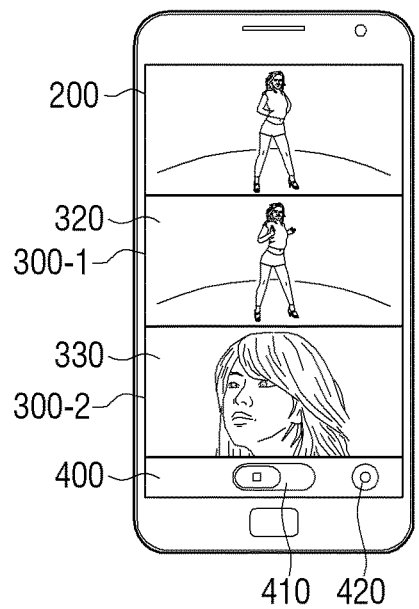

FIG. 11
(a)
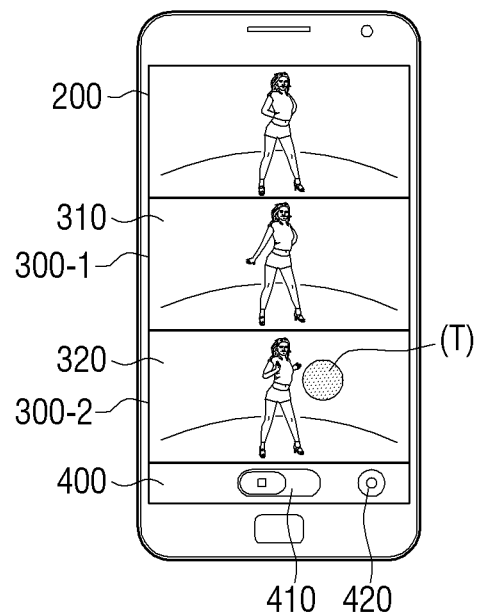
(b)
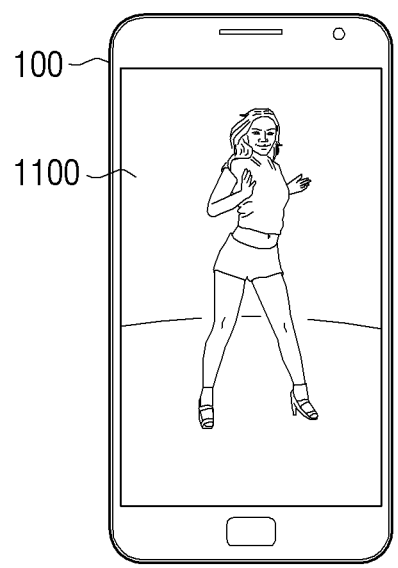

PHOTOGRAPHING DEVICE FOR DISPLAYING IMAGE AND METHODS THEREOF

CROSS-REFERENCE TO RELATED APPLICATION(S)

This application claims priority from Korean Patent Application No. 10-2012-0134824, filed on Nov. 26, 2012, in the Korean Intellectual Property Office, the disclosure of which is incorporated by reference in its entirety.

BACKGROUND

1. Field

Apparatuses and methods consistent with exemplary embodiments relate to a photographing device and a method thereof and more particularly, to a photographing device for displaying photographed images on a screen and a method thereof.

2. Description of the Prior Art

Many related art portable devices are equipped with displays and cameras. Related art portable devices, using incident light which passes through a lens, display a live view on a display. Further, a user may perform photography during the live view.

After performing photographing, users may like to check whether or not the images they have taken look good. In this case, a separate application is executed to check the stored images. Consequently, photographing process is suspended to check photographed images.

Moreover, in another photographing device of the related art, when a photo is taken, photographed images are displayed for a preset time (e.g., 1 or 2 seconds), instead of live view, so that users may check photos taken. However, when such a time is elapsed, a screen changes again to a live view screen. Therefore, in order to check photos in detail for a longer time, a separate application should be executed, resulting in user inconvenience.

Accordingly, a method is needed for checking photographed images and not suspending photographing.

SUMMARY

One or more exemplary embodiments provide a photographing device and a method thereof, so that users may easily check photographed images while performing photographing by displaying a live view and photographed images together on a screen.

According to an aspect of an exemplary embodiment, there is provided a method for photographing of a photographing device including displaying a photographing screen which is divided into a live view area and at least one photographed image area; displaying a photographed image on the at least one photographed image area in response to photographing being performed; and scrolling the at least one photographed image area in a direction corresponding to a scroll gesture of a user in response to the scroll gesture on the photographing screen being input.

The method may further comprise, displaying a selection screen to select a manual photographing method in response to a mode selection menu being selected; and generating the photographing screen in response to a film roll mode being selected from the selection screen.

Herein, the mode selection menu to select one of a manual photographing method and an automatic photographing method may be displayed on the photographing screen.

The manual photographing method may include performing the photographing in response to a photographing command being input, and wherein the automatic photographing method may comprise performing the photographing in response to a predetermined photographing condition being satisfied or the photographing command being input.

Meanwhile, the live view area and the at least one photographed image area may be scrolled together in accordance with the scroll gesture, wherein the photographing may further include, returning to the photographing screen in a state prior to performing the scroll gesture in response to the photographing command being input while the scroll gesture is performed.

The live view area may be fixed, and only the at least one photographed image area may be scrolled in accordance with the scroll gesture.

The method may further include deleting an image in response to a delete gestures being input on the image displayed on the at least one photographed image area; and displaying a selected image on a full screen in response to the image displayed on the at least one photographed image area being selected.

The method may further include adjusting location and type of the live view area and the at least one photographed image area by changing a layout of the photographing screen in accordance with a rotation direction of the photographing device in response to the photographing device being rotated.

According to an aspect of another exemplary embodiment, there is provided a photographing device including a photographing unit, a storage configured to store an image photographed by the photographing unit; a display configured to display a photographing screen which is divided into a live view area and at least one photographed image area; and a controller configured to store the photographed image in the storage and display the photographed image on the at least one photographed image area. In this case, the controller may be configured to control the display to scroll the at least one photographed image area in a direction corresponding to a scroll gesture of a user in accordance with the scroll gesture in response to the scroll gesture being input on the photographing screen.

The controller may be configured to control the display to display the photographing screen in response to a photographing function being activated, control the display to display a selection screen to select a manual photographing method in response to a mode selection menu being selected on the photographing screen, and control the display to display the photographing screen in response to a film roll mode being selected on the mode selection screen.

The mode selection menu to select one of the manual photographing method and an automatic photographing method may be displayed on the photographing screen, wherein the controller may be configured to control the photographing unit to perform the photographing in response to a photographing command being input in response to the manual photographing method being selected, and wherein the controller may be configured to control the photographing unit to perform the photographing in response to a predetermined photographing condition being satisfied or the photographing command being input in response to the automatic photographing method being selected.

The controller may be configured to control the display to scroll the live view area and the at least one photographed image area in accordance with the scroll gesture in response to the scroll gesture being input, wherein the controller may be configured to control the photographing unit to return the photographing screen in a state prior to the scroll gesture in response to the photographing command being input while the scrolling is performed, and wherein the controller may be configured to control the photographing unit to perform the photographing in response to the photographing command being re-input.

The controller may be configured to control the display to scroll the at least one photographed image area in a direction corresponding to the scroll gesture of a user while the live view area is fixed in response to the scroll gesture on the photographing screen being input.

The controller may be configured to delete the photographed image stored in the storage in response to a delete gesture being input on the photographed image displayed on the photographed image area, and wherein the controller may be configured to control the display to display a selected photographed image on a full screen in response to the photographed image displayed on the photographed image area being selected.

The device may further include a rotation detector configured to detect rotation of the photographing device; wherein the controller may be configured to control the display to adjust location and type of the live view area and the at least one photographed image area by changing a layout of the photographing screen in accordance with a rotation direction of the photographing device in response to the photographing device being rotated.

According to an aspect of another exemplary embodiment, there is provided a photographing method, the method including displaying a photographing screen including a live view area and at least one photographed image area; monitoring whether at least one photographing condition is satisfied in an automatic photographing mode; performing photographing if the at least one photographing condition is satisfied; displaying a photographed image on the at least one photographed image area; and displaying the photographing screen after the photographing has been performed until the photographing method is terminated.

According to exemplary embodiments, a user may view photographed images easily and rapidly, as the device displays at least one photographed image on a screen while providing a live view.

BRIEF DESCRIPTION OF THE DRAWINGS

The above and/or other aspects will be more apparent by describing certain exemplary embodiments with reference to the accompanying drawings, in which:

FIG. 5 is a view illustrating a drawing which explains a method to select a manual photographing method or an automatic photographing method, FIGS. 8-9 are drawings illustrating examples of a method for scrolling a photographing window according to a user's gesture, FIG. 10 is a view illustrating a drawing which explains a method of deleting images according to a user gesture, FIG. 11 is a view illustrating a drawing which explains a method of enlarging images according to a user gesture.

DETAILED DESCRIPTION OF THE EXEMPLARY EMBODIMENTS

Figure 1:
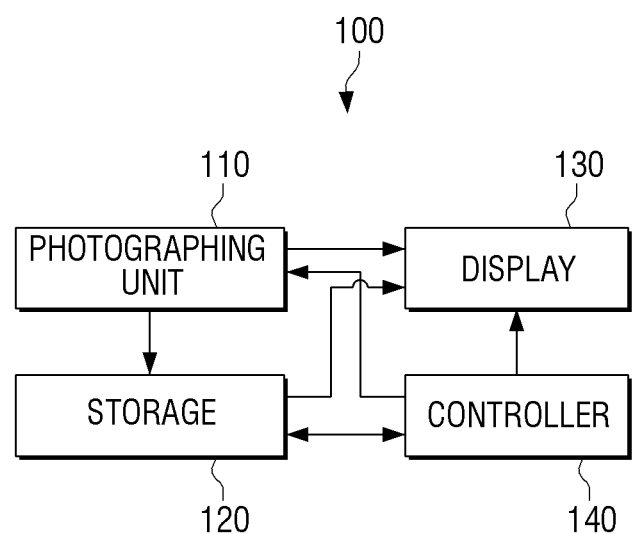
FIG. 1 is a view illustrating a block diagram which illustrates the configuration of a photographing device according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating a block diagram which illustrates the configurations of a photographing device according to an exemplary embodiment. A photographing device may be embodied as various devices including a digital camera, camcorder, cellular phone, tablet PC, lap top computer, PDA, and MP3 player, etc.

Referring to FIG. 1, a photographing device 100 includes a photographing unit 110, a storage 120, a display 130, and a controller 140.

The photographing unit 110 performs photographing according to control of the controller 140. The photographing unit 110 is embodied in the type of including a lens and an image sensor. A type of a lens usable to the photographing unit 110 includes a general lens, a wide angle lens, and a zoom lens. Such type may be decided in accordance with the types, features, and environments of the photographing device 100. An image sensor includes Complementary Metal Oxide Semiconductor (CMOS), Charge Coupled Device (CCD), etc.

The storage 120 stores an operation program, application, data, etc. to operate the photographing device 100. The storage 120 may store photographed images photographed by the photographing unit 110.

The controller 140 controls overall operation of the photographing device 100 by executing an operation program stored in the storage 120. Specifically, the controller 140 may control the display 130 to display a photographing screen.

The display 130 displays a photographing screen which is divided into a live view area and at least one photographed image area. In a live view area, live view is displayed. In a photographed image area, an image previously photographed image is displayed. Live view indicates an image which is provided so that a subject may be confirmed through the display 130 instead of a view finder. In particular, incident light which passes through a lens of the photographing unit 110 enters an image sensor, and the image sensor outputs an electrical signal corresponding to the incident light to the display 130. Therefore, subject within a scope of current photographing is displayed on a live view area. The live view may be provided according to various methods such as contrast AF (Auto Focus) live view method, phase-contrast AF live view method, and the method of using a separate image sensor for processing live view, etc.

A photographing screen which includes both live view area and photographing image area may be basically provided or selectively provided according to an exemplary embodiment. For example, according to an exemplary embodiment, the above-described photographing screen may be provided as a basic screen which is displayed when a photographing function is activated. According to another exemplary embodiment, a photographing screen including only a live view area is provided in a general photographing mode. Further, a photographing screen including both a live view area and a photographing image area may be provided in a special photographing mode.

When a photographing command is input while a photographing screen is displayed, the controller 140 controls the photographing unit 110 to perform photography. The photographing command may be input to the controller 140, when a photographing menu which is displayed within a key in the photographing device 100, or the photographing screen, is selected.

When photographing is performed, the controller 140 stores a photographed image on the storage 120. In addition, the controller 140 controls the display 130 so that a photographed image is displayed on a photographed image area within a photographed image area sequentially. In other words, an image previously displayed at a photographed image area is replaced with a newly photographed image. According to an exemplary embodiment, a photographed image area may be embodied as one area or as a plurality of areas. When a plurality of photographed image areas are prepared, the controller 140 may display from the most recently photographed image in an order of closeness to a live view area.

Figure 2:
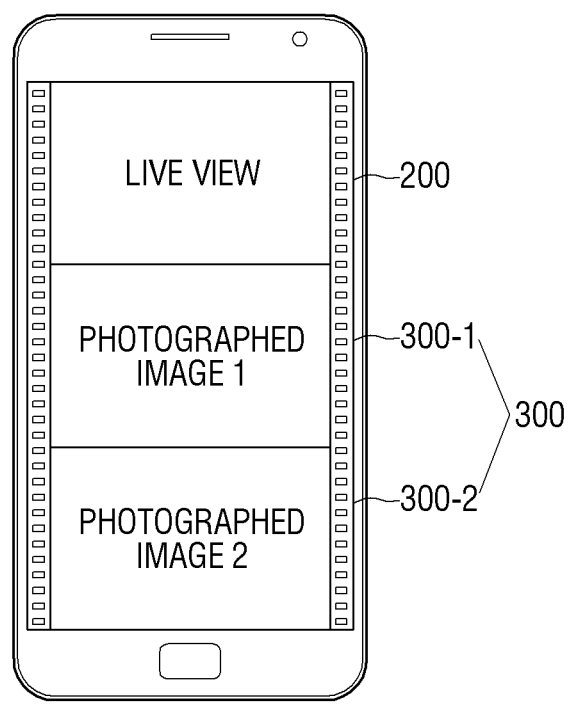
FIG. 2 is a view illustrating a drawing which illustrates an example of the configuration of a photographing screen.

FIG. 2 illustrates an exemplary embodiment of the configuration of a photographing screen. According to FIG. 2, a live view area 200 and a photographing image area are displayed on a photographing screen. Number, size, location, etc., of a photographing image area 300-1, 300-2 may become different in accordance with size and shape, etc., of the display 130. For example, FIG. 2 illustrates a case where, on the photographing device 100 equipped with the display 130 which has a length larger than a width, the live view area 200 is displayed on top, and two photographing image areas 300-1, 300-2 are disposed side by side at a lower part of the live view area 200 On the other hand, unlike FIG. 2, when a tablet PC which has a width larger than a length is embodied, the live view area 200 is disposed at the end part on the left of a screen, and the photographed image area 300-1, 300-2 may be sequentially disposed on the right side thereof.

When photographing is performed on a photographing screen of FIG. 2, newly photographed image is displayed on the first photographed image area 300-1, and the previously-displayed image is shifted to the second photographed image area 300-2 and displayed. Accordingly, a user may immediately confirm previously photographed image while confirming the present status of a subject through the live view area 200.

Figure 3:
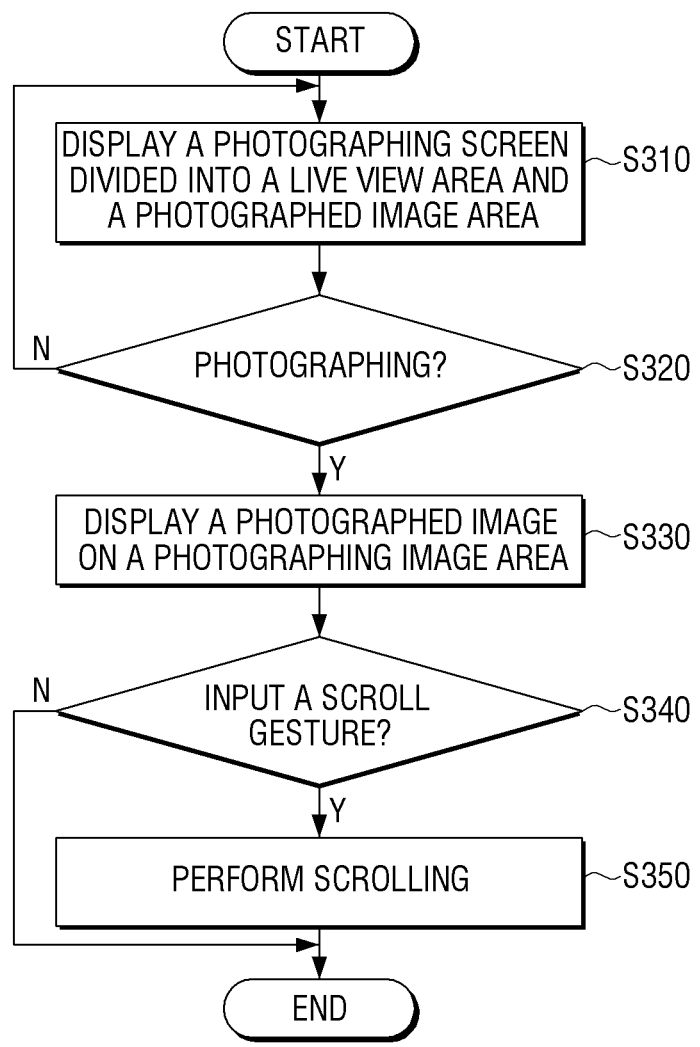
FIG. 3 is a view illustrating a flow chart which explains a photographing method according to one exemplary embodiment.

FIG. 3 is a view illustrating a flow chart which explains a method of photographing according to an exemplary embodiment. According to FIG. 3, the photographing device 100 displays a photographing screen which is divided into a live view area and a photographing image area (S310).

In this circumstance, if photographing is performed (S320), a photographed image is displayed on the photographed image area (S330). An image displayed on a photographed image area is sequentially disposed according to an order of photographing. For example, in a case of a photographing screen in the same type as FIG. 2, newly photographed image is displayed on the first photographed image area 300-1 adjacent to the live view area 200, and an image previously displayed on the first photographed image area 300-1 is shifted to the second photographed image area 300-2, which is the next location.

A user may confirm an image photographed just before on a photographing screen using a scroll gesture. In other words, when a user inputs a scroll gesture (Step S340), the photographing device 100 performs scrolling (Step S350). Scrolling indicates relocating a photographed image area within a photographing screen. In this case, an image relocated to the side of a screen gradually disappears by being hidden by the side of the screen, and a new image is gradually displayed from the opposite side. A scroll gesture and scrolling will be further explained below.

Figure 4:
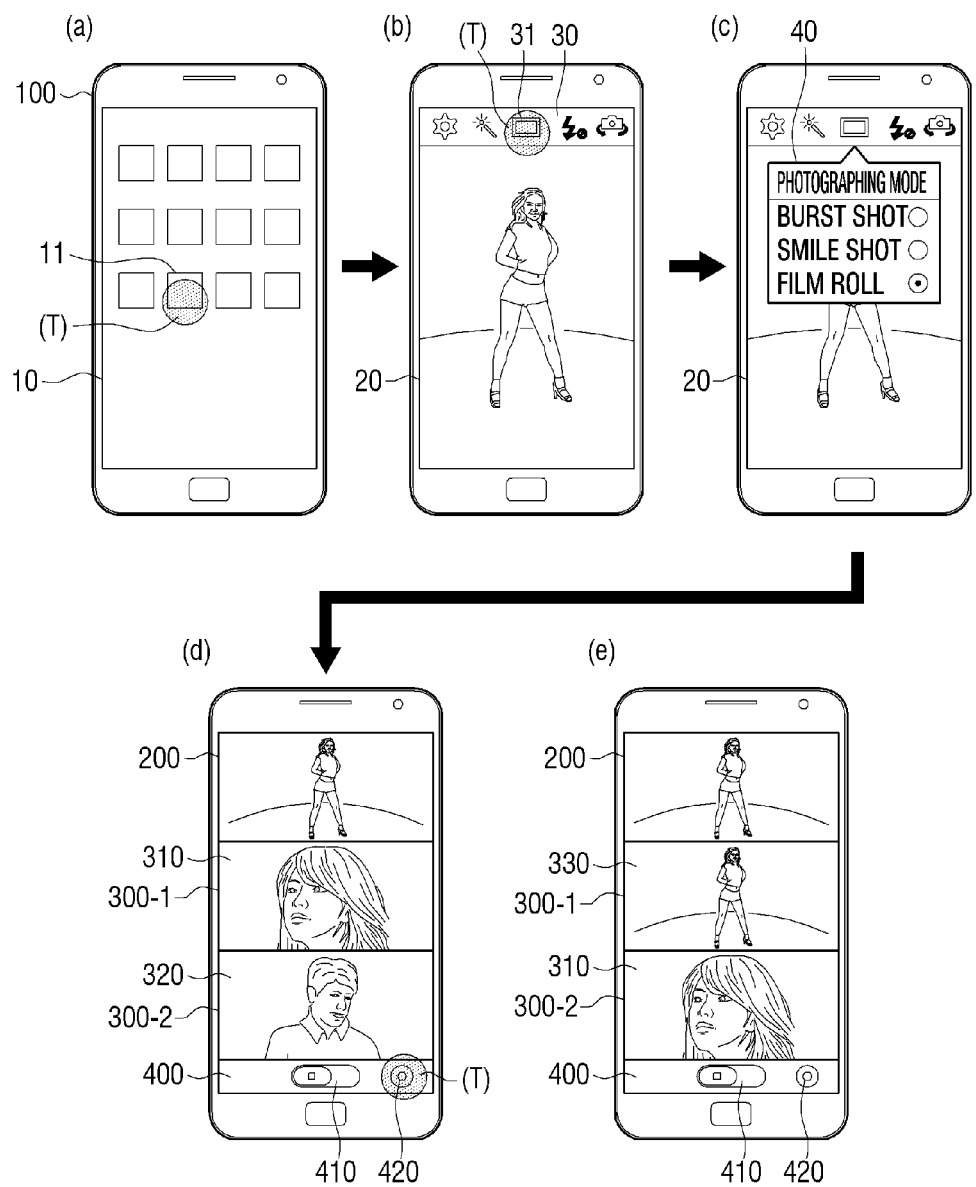
FIG. 4 is a view illustrating an example of a window which explains a photographing method.

As described above, a photographing screen having a layout divided into a live view area and a photographing image area may be a default screen provided when a photographing function is activated. Alternatively, the photographing screen may be a screen selectively provided in a specific mode. FIG. 4 is a view illustrating a method of changing a screen according to an exemplary embodiment providing a photographing screen with the above-described layout.

According to FIG. 4, the photographing device 100 displays a background screen 10 including a plurality of icons. The background screen 10 may be a home screen or an application display screen which displays an installed application. Further, the background screen 10 may be a displayed list including a text showing an application or a folder name, instead of each icon.

As illustrated in view (a) of FIG. 4, when an icon 11 showing a photographing application is touched (T), a photographing function is activated. Accordingly, as illustrated in view (b) of FIG. 4, a general photographing screen 20 is displayed. The general photographing screen 20 displays a live view, and at a side on the screen, a menu area 30 is displayed. In the menu area 30, various menus may be used by a user while photographing is displayed. In the menu area 30, various menus may be displayed including a photographing menu for inputting a photographing command, a selection menu for selecting still video photographing function and video function, a mode selection menu for selecting a photographing menu, a camera selection menu for selecting one of a front or back camera, and a flash adjustment menu for selecting use of a flash.

When a mode selection menu 31 is selected within the menu area 30, as illustrated in view (c) of FIG. 4, the controller 140 controls the display 130 to display the selection screen 40 on a plurality of photographing modes. In FIG. 4, the selection screen 40 including three photographing modes such as a burst shot mode, a smile shot mode, and a film roll mode are illustrated. However, according to types or functions of the photographing device 100, a photographing mode may be provided in a varied manner. For example, in the photographing mode, there may be various modes including a burst shot mode, a smile shot mode, an action shot mode, a film roll mode, a 3D photographing mode, and a panorama photographing mode, etc.

A general photographing mode is a general operation mode which photographs one photo according to a user's photographing command. The burst shot mode is a mode to consecutively photograph a plurality of photos, the smile shot mode photographs a subject when a subject is smiling, the action shot mode photographs a subject when a subject moves, the 3D photographing mode creates a 3D image by photographing left-eye image and right-eye image respectively, and the panorama photographing mode is a mode performs serial photographing and creating one panorama image by combining photographed images.

Among the above, the film role mode provides both live view and photographed images on one screen. In other words, the film role mode is a mode with which a user may confirm the status of a subject and images previously photographed as if they are in a film role. The names are arbitrarily decided. Thus, exemplary embodiments are not limited to these names, and another name other than the film role mode may be used.

As illustrated in view (c) of FIG. 4, when a film role mode is selected within a selection screen 40, as illustrated in view (d) of FIG. 4, the controller 140 displays photographing screens which are divided into the live view area 200 and at least one photographing image areas 300-1 and 300-2. In the first photographed image area 300-1, a first photographed image 310 mostly recently photographed is displayed. In the second photographed image area 300-2, a second photographed image 320 is displayed which is photographed just prior to the first photographed image 310.

In the photographing screen, a selection area 400 where a user may select a photographing command or a photographing method may be additionally displayed. In the selection area 400, a selection menu 410 for selecting a photographing method and a photographing menu 420 for inputting a photographing command are displayed.

When a user touches (T) the photographing menu 420, photographing is performed. When photographing is performed, an image displayed on a live view area at the time of photographing is created as a photographed image and stored at the storage 120.

As illustrated in view (e) of FIG. 4, a newly photographed image 330 is displayed on the first photographed image area 300-1, and the first photographed image 310 previously displayed is shifted to the second photographed image area 300 and is displayed.

In view (d) of FIG. 4, the status when the selection menu 410 is selected as a manual photographing method is illustrated. However, the photographing method may be easily selected as a manual photographing method or an automatic photographing method according to the selection menu 410.

FIG. 5 illustrates an exemplary embodiment of a method of selecting a photographing method. As illustrated in view (a) of FIG. 5, the selection menu 410 may be composed of a bar-shaped home and a button which is displayed as a shape movable within the home. While touching a button, a user may select a photographing method by sliding a button in the left direction or the right direction. Referring to views (a) and (b) of FIG. 5, when the selection menu 410 is slid on the left side, a manual photographing method is selected, and when the selection menu 410 is slid on the right side, an automatic photographing method is selected.

Manual photographing method indicates performing photography whenever a photographing command is input by a user selecting the photographing menu 420. Automatic photographing indicates performing photography automatically when a preset photographing condition is satisfied, instead of when the photographing command is input.

Photographing condition may be set variously in accordance with the type of the photographing device 100, characteristics of a hardware and a software, and use environment, etc. In particular, various photographing conditions can be selected such as the condition where at least one of a subject and the photographing device 100 is not shaken, a certain or higher portion of a face of a subject is exposed, a subject smiles, a subject's expression change is detected, a subject opens eyes, a subject moves, a subject takes a certain motion, an audio command corresponding to a photographing command is input, and preset timing cycle is nearing, etc. Further, various photographing conditions can be selected such as the condition when a subject moves greater than the predetermined speed, serial photographing may be performed automatically.

The controller 140 controls the photographing unit 110 to perform photography when an automatic photographing method occurs in response to the above-described various photographing conditions being satisfied. Further, if a user input is detected to select the photographing menu 420, the controller 140 controls the photographing unit 110 to perform photography.

Figure 6:
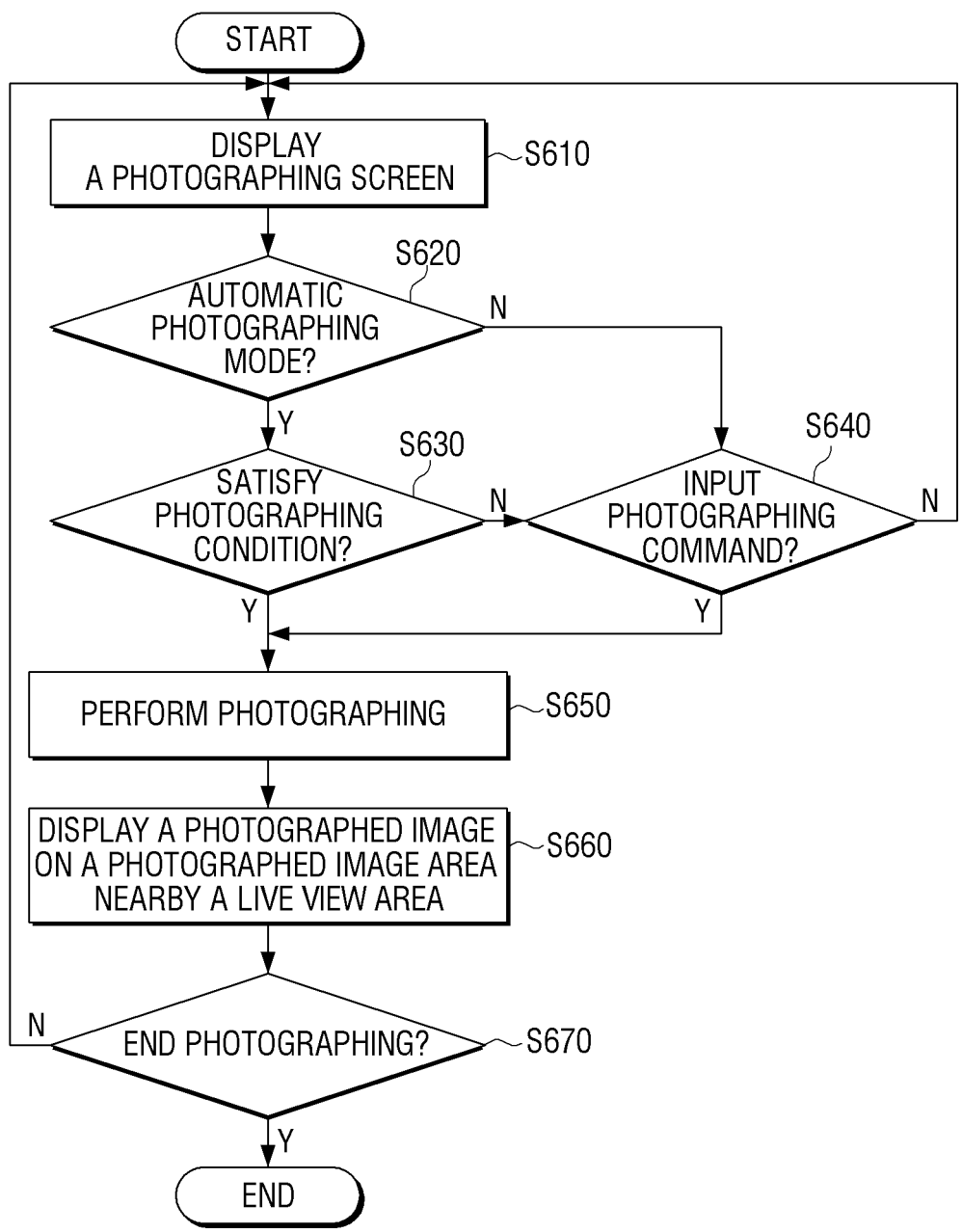
FIG. 6 is a flowchart illustrating a flow chart which explains a method according to photographing method.

FIG. 6 is a view illustrating a flow chart for explaining a detailed photographing method in accordance with selection of a photographing method. According to FIG. 6, the photographing device 100 displays a photographing screen including a live view area and a photographed image area (S610).

In this circumstance, when an automatic photographing mode is selected (S620), a photographing device continues to monitor whether preset photographing condition is satisfied (S630). During monitoring, if it seems that the photographing condition is satisfied, the photographing device 100 performs photographing (S650).

When automatic photographing mode is not selected or automatic photographing mode is selected, photographing may be performed according to a photographing command. In other words, a photographing device detects whether or not a photographing command is input (S640). If the photographing command is input, photographing is performed (S650).

A photographed image is displayed on a photographed image area around a live view area (S660). The photographing device continues to display the photographing screen (S610), until a photographing function is terminated (S670), so that a user may manually or automatically perform photographing while confirming a live view and a photographed image on one screen.

As described above, a live view and a photographed image are displayed together on the photographing screen, and a user may directly confirm and process the photographed image on a screen.

Figure 7:
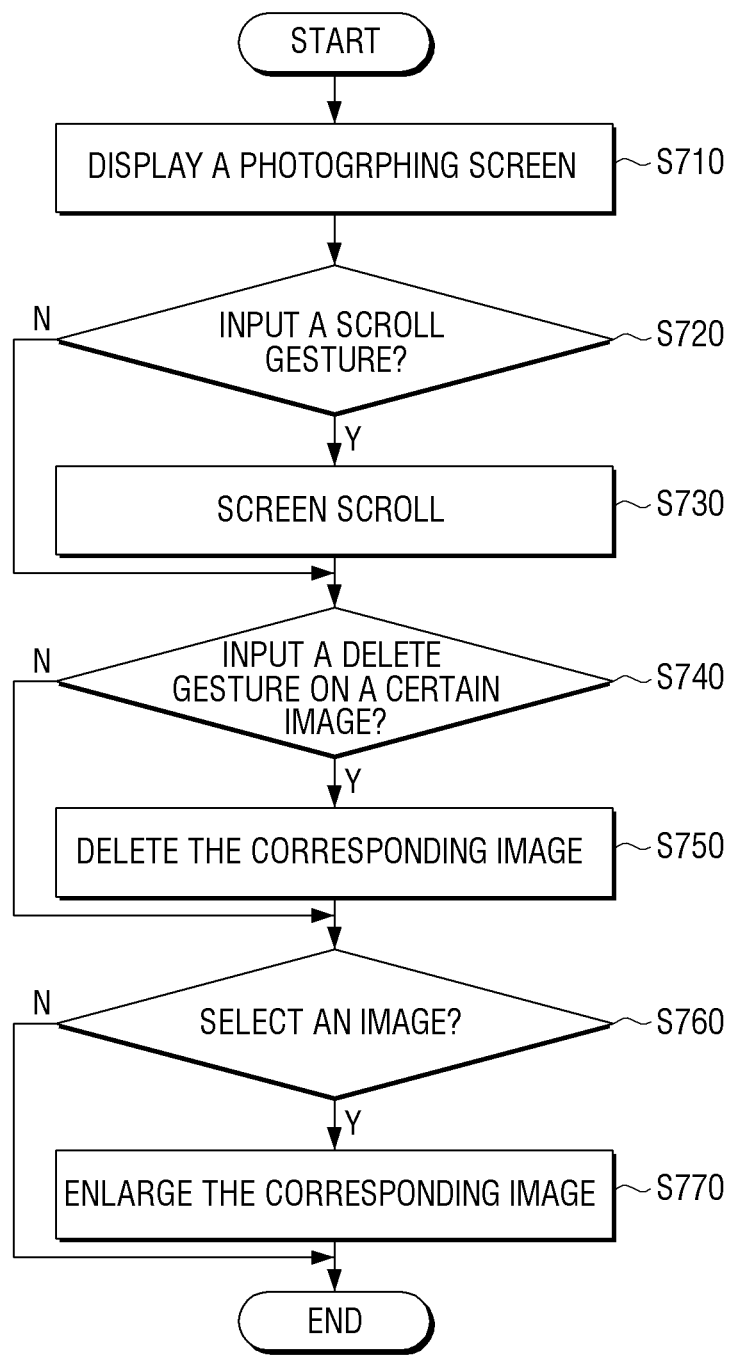
FIG. 7 is a flowchart illustrating a method to change a window according to a user gesture.

FIG. 7 is a view illustrating a flow chart which explains a method of displaying the photographing device on a screen according to another exemplary embodiment.

According to FIG. 7, the photographing device, may display the photographing screen (S710). The photographing screen may be a type only including a live view area and a photographing image area (as illustrated in FIG. 2), or a type including a selection area as well (as illustrated in FIG. 4).

In this circumstance, a user may input a scroll gesture (S720). A scroll gesture is a gesture for scrolling the photographing screen. If the photographing device includes a touch screen, the scroll gesture may be set as a gesture to touch the photographing screen and drag the screen to a direction or a flicking gesture. The scroll gesture may be performed in a direction parallel to a direction where the live area 200 and the photographed image area are aligned. For example, in a case of a photographing screen having a structure shown in FIG. 2, the scroll gesture in an up or down direction may be performed. In addition, if there exists a direction key in a body of the photographing device or a direction button in the photographing screen, a gesture to select such a direction key or a direction button may be the scroll gesture.

When the scroll gesture is input, the photographing device scrolls a screen (S730). Scrolling may be performed in a varied method according to exemplary embodiments.

In addition, a user may input a deletion gesture within the photographed image area (S740). The deletion gesture, while a user touches one of the photographed image areas, may be a dragging or flicking gesture in a direction parallel to a direction where each area is aligned. Alternatively, similar to the scroll gesture, if a deletion key in a body or a deletion button within a photographing screen is selected, the deletion gesture may occur. If the deletion gesture is input, the photographing device 100 deletes the corresponding image (S750).

In addition, a user may select one area among the photographed image areas (S760). As for the selection gesture, various gestures may be set including simple touch, long touch, and double touch.

If the selection gesture is input, the photographing device enlarges and displays the selected image (S770). In this case, similar to a gallery application, not a photographing application, a separate application to confirm a stored image may be operated to perform displaying enlargement.

As described above, the photographing device may process a photographed image in various methods according to a user gesture by displaying the live view and the photographed image together.

FIG. 8 and FIG. 9 illustrate various examples with a scroll method.

As illustrated in view (a) of FIG. 8, when a user touches (T) a certain point in the photographing screen, and drags or flags the point in a direction, the live view area 200 and the photographed image area 300-1, 300-2 may be scrolled together.

Accordingly, as illustrated in view (b) of FIG. 8, a new photographed image area 300-3 may be displayed, while the live view area 200 disappears from the screen.

As illustrated in view (a) of FIG. 8, when the scroll gesture is continuously input in the direction of the live view area 200, the photographed images aligned in the order of photographing timing are scrolled sequentially from the bottom of the screen and displayed. Therefore, a user, while not operating a separate gallery program, may easily confirm the images photographed previously.

As illustrated in views (a) and (b) of FIG, even if the scrolling is performed, location and shape of the selection area 400 are fixed. While scrolling the live area and the photographed image area, if a user would like to begin photographing again, the user may select the photographing menu 420. While the scrolling is done, if a photographing command is input, the controller 140 controls the display 130 to return to the photographing screen in the state before the scrolling, i.e., the original photographing screen where the live view area 200 and the photographed image area 300-1, 300-2 are included.

FIG. 9 is a view illustrating a drawing which explains another scrolling method. As illustrated in view (a) of FIG. 9, a user may input the dragging or flicking scroll gesture in a direction by touching (T) a certain point on the photographing screen. In this case, as illustrated in view (b) of FIG. 9, the controller 140, while the live view area 200 is fixed, scrolls only at least one photographed image area according to the scroll gesture.

As illustrated in view (b) of FIG. 9, if the scroll gesture is performed in an up direction, the first photographed image area 300-1 disappears from the boundary with the live view area 200, and a new photographed image area 300-3 is displayed on the bottom.

According to FIG. 9, a user may sequentially confirm the images photographed previously while viewing the live view.

After selecting one photographed image, a user may scroll the image to a direction and select another photographed image. In this case, the photographed images between the photographed images selected ahead and the photographed images selected last may be clipped and stored as a file. Therefore, a simple clip video may be created by collecting serial photos.

FIG. 10 is a view illustrating a method for deleting a certain message. According to view (a) of FIG. 10, after one photographed image area 300-1 is touched within a photographing screen including the live view area 200, a plurality of photographed image area 300-1, 300-2, and a selection area 400, a flicking or dragging deletion gesture may be input in a right direction vertical to each area. In this case, as illustrated in view (b) of FIG. 10, the controller 140 deletes the first photographed image 310 displayed on the corresponding photographed image area 300-1, and relocates the second photographed image 320 displayed on the second photographed image area 300-2 to a location of the first photographed image area 300-1 and displays the same. In addition, the third photographed image 330, which has not been displayed before, is relocated to the second photographed image area 300-2, and the same is displayed.

The controller 140 may directly delete a photographed image from the storage 120, which has been deleted from a photographing screen. Alternatively, if embodied in a different manner, the controller 140 displays an on screen display (OSD) message to confirm whether an image is deleted or not. If a user re-inputs delete command, the image may be deleted from the storage 120.

Although not illustrated in FIG. 10, if a user inputs a flicking or dragging gesture in a left direction, operations other than deletion may be matched. In particular, copying of the corresponding image, setting the image in a lock status, attaching the corresponding image to an e-mail or a messenger, etc., may be matched. The controller 140, when a gesture to move to a left side is input, may perform the operation matched with the corresponding gesture.

FIG. 11 is a view illustrating a method for selecting and enlarging a certain image. According to view (a) of FIG. 11, a user may select a photographed image area within a photographing screen including the live view area 200, a plurality of photographed image area 300-1, 300-2, and the selection area 400. Selection may have various types such as simple touch, long touch, double touch, etc.

As illustrated in view (a) of FIG. 11, when a user selects the second photographed image 320, the controller 140 may enlarge the second photographed image 320 on the full screen and display, as illustrated in view (b) of FIG. 11. In this case, the controller 140 may enlarge and display a selected image by closing or temporarily stopping a photographing application, and newly operating a separate program such as a gallery program to confirm the image. In case of a pinch-in or a pinch-out for an image displayed on a full screen, the controller 140 may perform zoom-in or zoom-out for the corresponding image. In addition, by providing various editing tools, editing may be performed according to a user's selection.

As described above, a user may confirm a photographed image on a photographing screen in detail or perform various operations such as deleting, etc.

Figure 12:
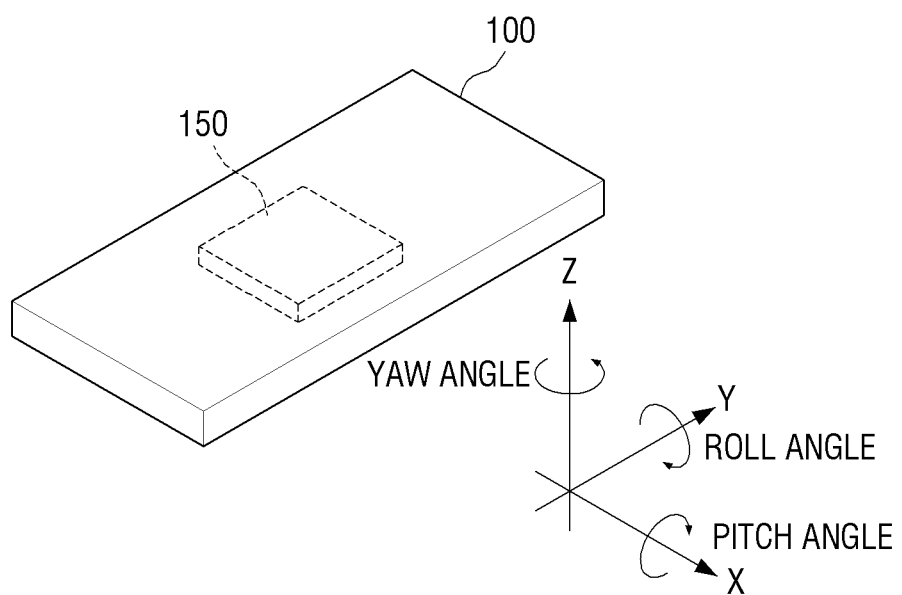
FIG. 12 is a view illustrating a drawing which displays a photographing device according to an exemplary embodiment which further comprises a rotation detector.

FIG. 12 is a view illustrating a drawing which indicates the configuration of the photographing device according to an exemplary embodiment. According to FIG. 12, the photographing device 100 may further comprise a rotation detector 150 to detect rotation of the photographing device.

The rotation detector may include a geomagnetic sensor, a gyro sensor, and an acceleration sensor, etc. As illustrated in FIG. 12, if the rotation detector 150 is in the photographing device 100, an X-axis, a Y-axis, and a Z-axis which is orthographically aligned to each other, is determined. Pitch angle indicates a rotation angle measured when centrally rotating on a Y-axis. Roll angle indicates a rotation angle measured when centrally rotating on an X-axis. Yaw angle indicates a rotation angle measured when centrally rotating on a Z-axis. Pitch angle and roll angle may be measured by acceleration sensor, and Yaw angle may be measured by a geomagnetic sensor or a gyro sensor.

The controller 140 may detect changes in the pitch angle, the roll angle, and the Yaw angle using an acceleration sensor, a geometric sensor, or a gyro sensor, and judge the present rotation status of the photographing device 100 according to the detection result.

The controller 140, when it is considered that the photographing device 100 is rotated, may change a layout of a photographing screen in accordance with a rotation direction. Accordingly, a user may select whether to take a photo whose width or length is longer.

Figure 13:
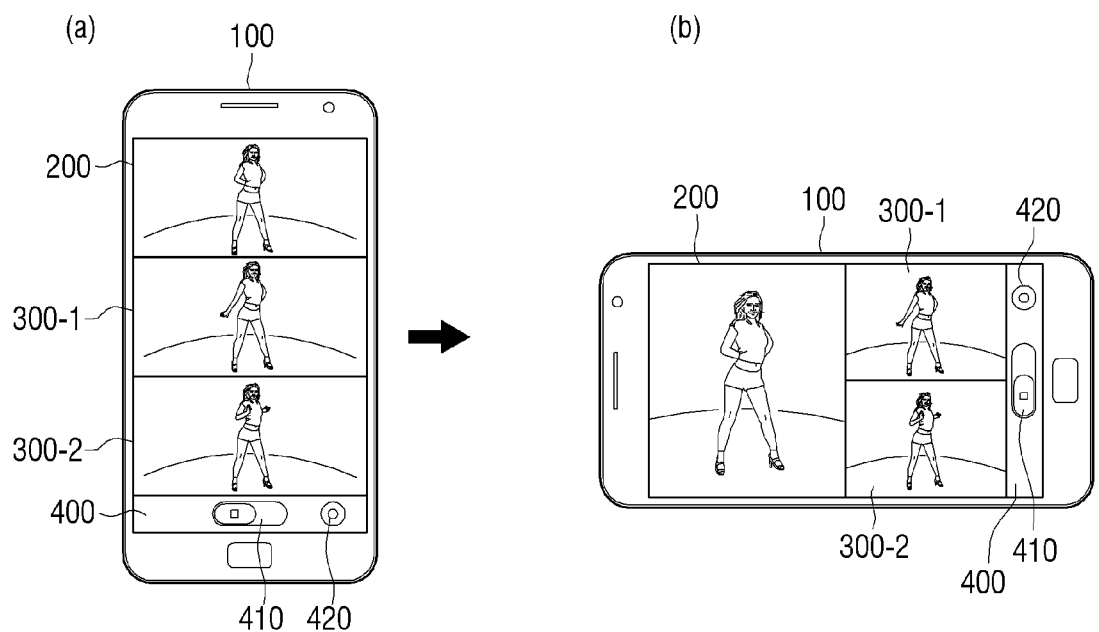
FIG. 13 is a view illustrating a method for changing screen of a photographing device according to an exemplary embodiment of FIG. 12, and, FIG. 14 is a view illustrating a block diagram which comprehensively explains the configurations of a photographing device according to various exemplary embodiments.

FIG. 13 is a view illustrating a drawing which explains a method for changing layout according to rotation. As illustrated in view (a) of FIG. 13, when the photographing device 100 is placed such that the length is longer than the width, the live view area 200 is disposed at the uppermost part, and the photographed image area 300-1, 300-2, and selection area 400 are disposed below.

In this circumstance, if an image is rotated in the left direction by the angle of 90 degrees, the controller 140 generates the live view area 200 on the left side of a screen in that its length is longer, and the photographed image area 300-1, 300-2 aligns the live view areas 200 by two on the right side in the up and down direction and displays them. The selection area 400 is displayed at the end of the right side.

In this circumstance, when a user touches a screen and flicks or drags the screen in a left direction, the photographed image area 300-1, 300-2 is scrolled in a left direction, and a third and a fourth photographed image areas are displayed together in a right direction.

On the other hand, when the flicking or dragging gesture is input on the first photographed image area 300-1 disposed on the upper side of a screen, or when the flicking or dragging gesture is input on the second photographed image area 300-2 on the lower side of a screen, a movement to delete the corresponding image may be performed.

As shown above, the controller 140, according to the rotation status of the photographing device, may get a user to confirm and process a photographed image easily even when an image is rotated, by adjusting a location and a type of the live view area and at least one photographed area.

In the above various exemplary embodiments, the photographing device 100 in a cell phone shape whose length is longer than its width is explained as an example. As explained above, the photographing device 100 may be embodied as an apparatus whose width is longer than width, such as a tablet PC. In this case, a photographing screen having the structure as shown in view (b) of FIG. 13 may be provided.

The configurations related to photographing and displaying photographed images are explained in the above-described various exemplary embodiments. However, the photographing device may include more various configurations according to types of the photographing device.

Figure 14:
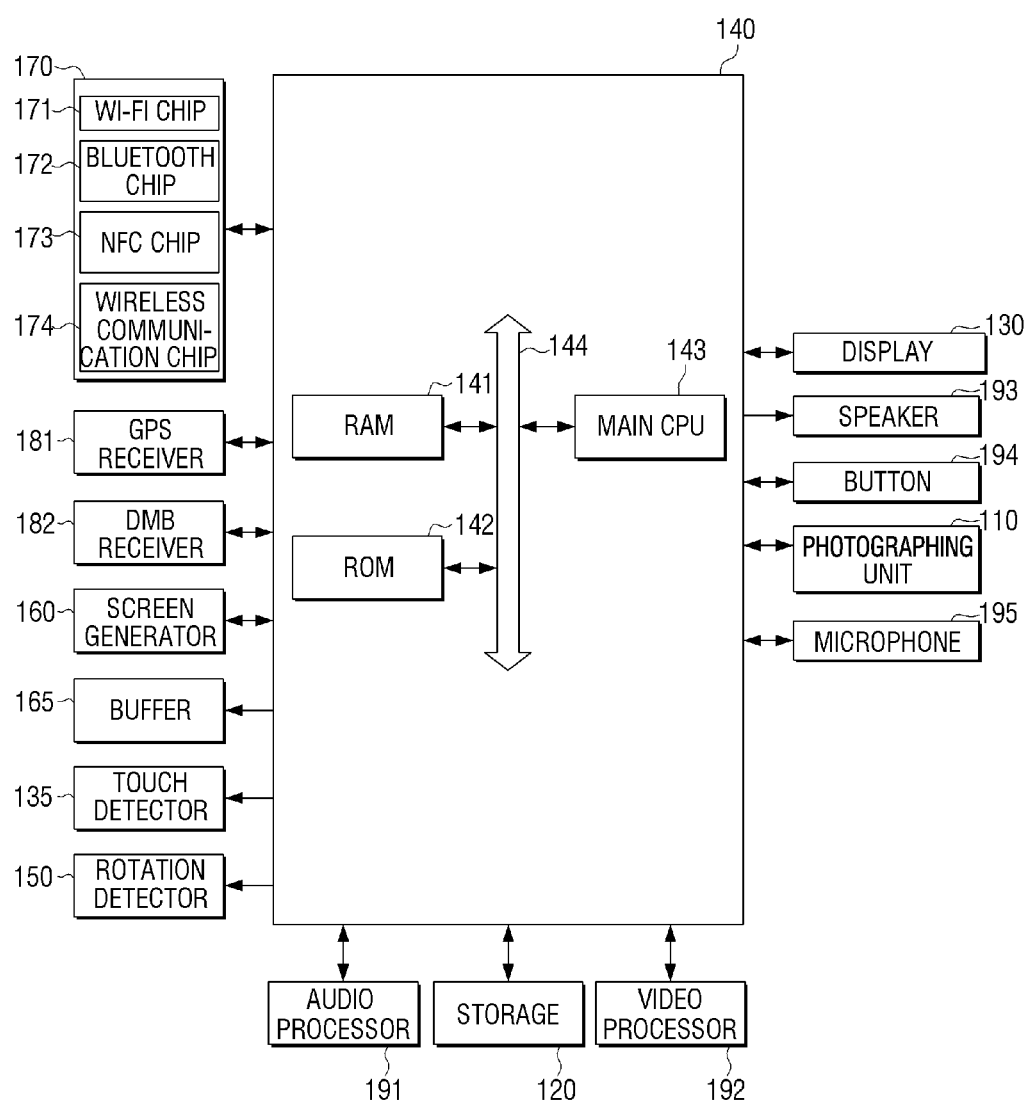

FIG. 14 is a view illustrating a block diagram which explains the configurations of the photographing device equipped with a communication function and a multimedia display function in a comprehensive manner.

Referring to FIG. 14, the photographing device 100 includes the photographing unit 110, the storage 120, the display 130, the controller 140, a rotation detector 150, a screen generator 160, a buffer 165, a communicator 170, a GPS receiver 181, a DMB receiver 182, a power unit 183, an audio processor 191, a video processor 192, a speaker 193, a button 194, and a microphone 195.

The screen generator 160 is a component to generate various types of a UI screen. The screen generator 160 may perform rendering of a selection area provided together with the live view area and the photographed image area on a part of a screen. In particular, the screen generator 160 may also include a calculator (not illustrated) and a rendering unit (not illustrated). The calculator, based on an object layout data stored in the storage 120, calculates a coordinate value where each object such as the selection menu 410 or photographing menu 420 is to be displayed and an attribute value such as a shape, size, and color. The rendering unit generates a screen having various layouts including an object based on calculated attribute value. Screen data generated in the rendering unit is stored in the buffer 165. Screen data stored in the buffer 165 maybe output on a screen by the display 130.

The touch detector 135 may be embodied as various sensors such as a capacitive sensor and a resistive sensor. A capacitive sensor has a method of calculating a touch coordinate using a dielectric coated on a surface of the display 130, when a part of a the body of a user is touched on a surface of the display 130 and detecting micro-electricity moved to the body of a user. A resistive sensor is a method of calculating a touch coordinate which includes two electrodes stored in the display 130. Further, when a user touches a screen, upper and lower substrates in the touched area are connected to each other and a flow of current is detected. As described above, the touch detector 135 may be embodied as various types. A touch coordinate detected in the touch detector 135 is provided to the controller 140. The controller 140 may determine, by comparing a coordinate of each object within a screen generated by the screen generator 160 with a touch coordinate of the touch detector 135, which object is selected. The controller 140, when a coordinate value of the touched area moves sequentially, may confirm a direction of movement, a distance of movement, and a speed of movement, etc., and confirm whether it is a scroll gesture or a deletion gesture. If a touch about the same point is detected sequentially within a preset hours, it is judged as a double touch. If a touch is detected for a time longer than a preset time, it is judged as a long touch. The controller 140, according to a result of judgment, may perform various movements such as scrolling, deleting, and enlarging.

The rotation detector, as described above, detects various measurement values relating to the rotation of the photographing device 100 and provides the controller 140 with the same. The controller 140, using this information, may change a screen layout as shown above.

The communicator 170 is the configuration of communicating with various external apparatuses according to various communication methods. The communicator 170 includes a Wi-Fi chip 171, a Bluetooth chip 172, NFC chip 173, and a wireless communication chip 174, respectively performing communication in the methods of the Wi-Fi method, the Bluetooth method, and the NFC method. Wireless communication chip 174 means a chip performing communication according to various communication specification such as IEEE, ZigBee, 3G (3rd Generation), 3GPP (3rd Generation Partnership Project), and LTE (Long Term Evolution) The communicator 170 may have at least one chip according to a communication specification and perform communication with an external server or other apparatuses.

The GPS receiver 181 is the configuration to figure out a current location of the photographing device 100 by receiving a GPS signal from a GPS (Global Positioning System) satellite.

A DMB receiver 182 is in a configuration to receive and process a DMB (Digital Multimedia Broadcasting) signal.

The audio processor is the configuration of processing audio data included in content. In the audio processor 191, various operations such as decoding, amplification, noise filtering on audio data may be performed.

The video processor 192 is the configuration which processes video data included in the contents. The video processor 192 may perform various images processing on video data such as decoding, scaling, noise filtering, frame rate conversion, resolution conversion, etc.

The audio processor 191 and the video processor 192 may be operated when a program to display content received from an external source or the content stored in the storage 120 is operated.

The display 130 may display an image frame generated by the video processor 192. In addition, the speaker 193 may output audio data generated by the audio processor 191.

In addition, the photographing device 100 may include at least one button 194. In the at least one button 194, various types of buttons such as a home button, a volume control button, and a power button can be included.

The photographing unit 110 is the configuration to photograph still images or video according to a user's control. The photographing unit 110, as described above, can be embodied as a plurality of units such as a front camera and a back camera.

A microphone 195 is the configuration which receives a user's voice or other sounds and converts the sounds to audio data. The controller 140 may use a user's voice input through the microphone 195 during calling or convert the voice to an audio and store in the storage 140. For example, the controller 140 may activate the microphone 195 when photographing video is performed.

In the storage 120, as described above, various programs and data are stored. In particular, in the storage 120, various images photographed by the photographing unit 110 are stored.

The controller 140 controls overall operations of the photographing device 100 using various programs and data stored in the storage 120. In particular, the controller 140 may include RAM 141, ROM 142, main CPU 143, a bus 144, etc.

RAM 141, ROM 142, main CPU 143, etc., can be connected to each other through a bus 144. In addition, various interfaces can be included. However, illustration and explanation of the various interfaces will be omitted.

Main CPU 143, by accessing the storage 120, performs booting using an O/S stored in the storage 120. In the ROM 142, a command set for system booting is stored. When power is supplied after a turn-on command is input, main CPU 143 copies the O/S stored in the storage 120 according to a command stored in the ROM 142 to the RAM 141, operates the O/S, and performs system booting. When booting is completed, the main CPU 143 copies various programs stored in the storage 120 to the RAM 141, operates programs copied in the RAM 141, and performs various operations.

In particular, the main CPU 143 controls the screen generator 160 by generating an icon on each program installed in the storage 120 to generate a background screen. Accordingly, when the background screen is displayed through the display 130, whether or not to select an icon is determined through the touch detector 135 or the button 194, etc. The main CPU 143, when it is determined that a photographing program is selected, copies a photographing program to the RAM 141 and operates it. According to operation of a program, the main CPU 143 activates the photographing unit 110. When the photographing unit 110 is activated, the photographing unit 110 provides the live view video to the display 130, and the display 130 displays the video on a full screen or a part of the screen.

For example, if a film roll mode is selected, the main CPU 143 can control the screen generator 160 to generate a photographing screen which is divided into the live view area and the photographed image area. The display 130 displays the live view video in the live view area on the photographing screen provided by the window generator 160, and displays the photographed image stored in the storage 120 in the photographed image area.

The main CPU 143, when various touch gestures are detected on the photographing screen by the touch detector 135 or rotation is detected by the rotation detector 150, may adjust the photographing screen accordingly.

FIG. 14 illustrates various components that can be loaded when the photographing device is embodied as a terminal apparatus which comprehensively supports various functions such as communication function, automatic rotation function, DMB function, GPS receiving function, etc. Therefore, according to an exemplary embodiment, a part of the components illustrated in FIG. 14 can be omitted or changed, and other components can be further added.

According to the above-described various exemplary embodiments, a user can immediately confirm the photographed photo. Thus, the user can have ceaseless photographing experiences. In particular, in a case of the automatic mode, a user can easily confirm the previously photographed images while keeping photographing. Thus, the user can rapidly determine whether or not to continue photographing. In addition, the user can make a simple clip image by collecting photos.

The above exemplary embodiments illustrate a case when a size of the live view area is the same as that of one photographed image area. However, it is not necessary that the size of the photographed image area is the same as the live view area. In other words, the size of the live view area can be slightly larger or smaller.

In addition, the above exemplary embodiments are explained based on photographing of a still image. However, the exemplary embodiments are not only applied to the still image. In other words, the photographing screen having a similar structure as the photographing screen described in the exemplary embodiments is provided while photographing a video. Thus, the video previously photographed can be confirmed. In this case, when the previous video is displayed on the photographing screen, the present photographing screen and the display screen of the previous video are displayed on one screen at the same time. Thus, a user can perform comparative photographing.

The photographing method according to the above-described exemplary embodiments can be coded with software and stored in the non-transitory readable media. The non-transitory readable media can be connected to or inserted in the above-described various types of the photographing device. Thus, the above-described photographing method can be implemented in the corresponding apparatus.

Non-transitory readable media refers not to media which stores data for a short period of time such as register, cash, memory, but to media which stores data for a semi-permanent amount of time and is readable by devices. In particular, the above-described various applications or programs can be stored in the non-transitory readable media such as CD, DVD, hard disk, Blue-ray disk, USB, memory card, ROM, etc., and provided.

The foregoing embodiments and advantages are merely exemplary and are not to be construed as limiting the exemplary embodiments. The present teaching can be readily applied to other types of devices. Also, the description of the exemplary embodiments is intended to be illustrative, and not to limit the scope of the claims. Therefore, many alternatives, modifications, and variations will be apparent to those skilled in the art.

What is claimed is:

1. A photographing method of a photographing device, the method comprising:
    displaying a photographing screen which is divided into a live view area and at least one photographed image area;
    displaying a photographed image on the at least one photographed image area in response to photographing being performed;
    scrolling the at least one photographed image area, while the live view area is fixed, in a direction corresponding to a scroll gesture of a user in response to the scroll gesture on the photographing screen being input; and
    clipping at least two photographed images, which are simultaneously displayed on the at least one photographed image area during the scrolling, as a file in response to receiving an input to select the at least two photographed images among scrolled photographed images,
    wherein the live view area and at least one photographed image area are disposed on one screen in the direction.

2. The method of claim 1, further comprising:
    displaying a selection screen to select a manual photographing method in response to a mode selection menu being selected; and
    generating the photographing screen in response to a film roll mode being selected from the selection screen.

3. The method of claim 2, wherein the mode selection menu to select one of the manual photographing method and an automatic photographing method is displayed on the photographing screen,
    wherein the manual photographing method comprises performing the photographing in response to a photographing command being input, and
    wherein the automatic photographing method comprises performing the photographing in response to a predetermined photographing condition being satisfied or the photographing command being input.

4. The method of claim 1, further comprising:
    deleting an image in response to a delete gesture being input on the image displayed on the at least one photographed image area; and
    displaying a selected image on a full screen in response to the image displayed on the at least one photographed image area being selected.

5. The method of claim 4, further comprising:
    adjusting location and type of the live view area and the at least one photographed image area by changing a layout of the photographing screen in accordance with a rotation direction of the photographing device in response to the photographing device being rotated.

6. A photographing device, the device comprising:
    a photographing unit;
    a storage configured to store an image photographed by the photographing unit; a display configured to display a photographing screen which is divided into a live view area and at least one photographed image area; and
    a controller configured to store the photographed image in the storage and display the photographed image on the at least one photographed image area;
    wherein the controller is configured to control the display to scroll the at least one photographed image area, while the live view area is fixed, in a direction corresponding to a scroll gesture of a user in response to receiving the scroll gesture, and clip at least two photographed images, which are simultaneously displayed on the at least one photographed image area during scrolling of the at least one photographed image area, as a file in response to receiving an input to select the at least two photographed images among scrolled photographed images,
    wherein the live view area and the at least one photographed image area are disposed on one screen in the direction.

7. The device of claim 6, wherein the controller is configured to:
    control the display to display a selection screen to select a manual photographing method in response to a mode selection menu being selected, and
    control the display to display the photographing screen in response to a film roll mode being selected on the selection screen.

8. The device of claim 7, wherein the mode selection menu to select one of the manual photographing method and an automatic photographing method is displayed on the photographing screen,
    wherein the controller is configured to control the photographing unit to perform the photographing in response to a photographing command being input in response to the manual photographing method being selected, and
    wherein the controller is configured to control the photographing unit to perform the photographing in response to a predetermined photographing condition being satisfied or the photographing command being input in response to the automatic photographing method being selected.

9. The device of claim 6, wherein the controller is configured to delete the photographed image stored in the storage in response to a delete gesture being input on the photographed image displayed on the photographed image area, and wherein the controller is configured to control the display to display a selected image on a full screen in response to the photographed image displayed on the photographed image area being selected.

10. The device of claim 9, further comprising:

a rotation detector configured to detect rotation of the photographing device, wherein the controller is configured to control the display to adjusts location and type of the live view area and the at least one photographed image area by changing a layout of the photographing screen in accordance with a rotation direction of the photographing device in response to the photographing device being rotated.

11. A photographing method, the method comprising:

displaying a photographing screen including a live view area and at least one photographed image area;

monitoring whether at least one photographing condition is satisfied in an automatic photographing mode;

performing photographing if the at least one photographing condition is satisfied;

displaying a photographed image on the at least one photographed image area;

displaying the photographing screen after the photographing has been performed, until the photographing method is terminated;

scrolling the at least one photographed image area, while the live view area is fixed, in a direction corresponding to a scroll gesture of a user in accordance with the scroll gesture in response to the scroll gesture being input on the photographing screen; and clipping at least two photographed images, which are simultaneously displayed on the at least one photographed image area during the scrolling, as a file in response to receiving an input to select the at least two photographed images among scrolled photographed images, wherein the live view area and the at least one photographed image area are disposed on one screen in the direction.

12. The photographing method of claim 11, wherein the at least photographing condition comprises at least one of a movement of a subject, a preset timing occurring, or a photographing device not being shaken.

13. The photographing method of claim 11, wherein the displaying the photographed image on the at least one photographed image area comprises displaying the photographed image sequentially in the at least one photographed image area such that the photographed image is displayed next to the live view area.

14. The photographing method of claim 11, wherein the live view area comprises a subject of photographing such that the subject is confirmed by the user before the photographing has been performed.

* * * * *